(12) United States Patent
Rafnsson

(10) Patent No.: US 7,293,021 B1
(45) Date of Patent: Nov. 6, 2007

(54) METHOD AND SYSTEM FOR PROVIDING DYNAMIC CAPABILITY DISCOVERY AND USE

(75) Inventor: Rognvaldur Kristinn Rafnsson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 560 days.

(21) Appl. No.: 10/898,692

(22) Filed: Jul. 23, 2004

(51) Int. Cl.
*G06F 17/30* (2006.01)

(52) U.S. Cl. .......................................... 707/6
(58) Field of Classification Search .................... 707/6, 707/10, 102, 104.1; 705/1, 26, 27, 37
See application file for complete search history.

(56) References Cited

U.S. PATENT DOCUMENTS 7,054,880 B2 * 5/2006 Vishik et al. ............... 707/102
7,076,558 B1 * 7/2006 Dunn ......................... 709/229

OTHER PUBLICATIONS

Bob Pascoe, "Salutation Architectures and the newly defined service discovery protocols from Microsoft and Sun: How does the Salutation Architecture stack up," Salutation Consortium White Paper, Jun. 6, 1999.
DNS Service Discovery (dns-sd), at least by Jun. 6, 2004.
Choonhwa Lee et al., "Protocols for Service Discovery in Dynamic and Mobile Networks", International Journal of Computer Research, vol. 11, No. 1, ISSN 1535-6698, pp. 1-12, 2002.
The Stencil Group, Inc. "The Evolution of UDDI: UDDI.org White Paper", Jul. 19, 2002.
Uddi.org, "UDDI Technical White Paper", Sep. 6, 2000.
Stuart Cheshire, "DNS-Based Service Discovery", Feb. 14, 2004.

* cited by examiner

*Primary Examiner*—Chong H Kim
(74) *Attorney, Agent, or Firm*—John D. Veldhuis-Kroeze; Westman, Champlin & Kelly, P.A.

(57) ABSTRACT

A method of providing dynamic service discovery to a client application includes receiving a context specific request, from the client application or component, to discover services available from applications or components. Based on the request, at least one list of services corresponding to the context specific request is retrieved and provided to the client application.

28 Claims, 6 Drawing Sheets

METHOD AND SYSTEM FOR PROVIDING DYNAMIC CAPABILITY DISCOVERY AND USE

BACKGROUND OF THE INVENTION

The present invention relates to methods of providing service discovery between software applications and software components. More particularly, the present invention relates to systems and methods which facilitate the sharing of functionality between independent software applications and loosely coupled components.

Current software applications are developed as islands—largely independent of each other. A user or administrator purchases an application that provides a certain set of features, and manages a certain set of data. Frequently, this application will not use functions or services available from other applications unless it was originally designed to do so.

The ability to make two or more applications utilize each other's functionality has typically been achieved by essentially hard coding the applications together. Thus, in order to get the applications to utilize each other's functionality, the applications must typically be created with the knowledge of each other's available functions or services, and be designed to utilize these services. In other words, in order to utilize each other's functions or services, the applications are not typically created independently of each other. In the alternative, independent applications created without regard to each other's functionality can utilize each other's services if significant additional code is created to link the applications together. This is labor intensive, particularly given the large number of applications that would potentially need to be hard coded together in this manner.

Methods of discovering available services for use with an application or system are known. For example, the Universal Description, Discovery and Integration (UDDI) project resulted in a specification for distributed World Wide Web (WWW) based information registries of Web services. UDDI includes a publicly accessible set of implementations of that specification that allow businesses to register information about the Web services they offer so that other businesses can find them. Publication of Web services allows others to create programs which will interact with these published services. However, the services published by UDDI are not listed or accessible in a context specific manner, which creates difficulties in sharing of functionality between independent software applications and loosely coupled components. Although service discovery such as is provided using UDDI can be useful, the above-described problems of allowing independently created (i.e., created without knowledge of each other's services) software applications to access each other's functionality in a loosely coupled (i.e., not hard coded) manner still remain.

The present invention provides solutions to one or more of the above-described problems and/or provides other advantages over the prior art.

SUMMARY OF THE INVENTION

A method of providing dynamic service discovery to a client application includes receiving a context specific request, from the client application, to discover services available from independent service providing applications. Based on the request, at least one list of services corresponding to the context specific request is retrieved and provided to the client application.

Other features and benefits that characterize embodiments of the present invention will be apparent upon reading the following detailed description and review of the associated drawings.

BRIEF DESCRIPTION OF THE DRAWINGS

FIGS. 3-1 is a diagrammatic illustration of a service providing application registering its service or capability with a capability manager.

FIGS. 3-2 is a diagrammatic illustration of a client application searching for services or capabilities using the capability manager.

DETAILED DESCRIPTION OF ILLUSTRATIVE EMBODIMENTS

Figure 1:
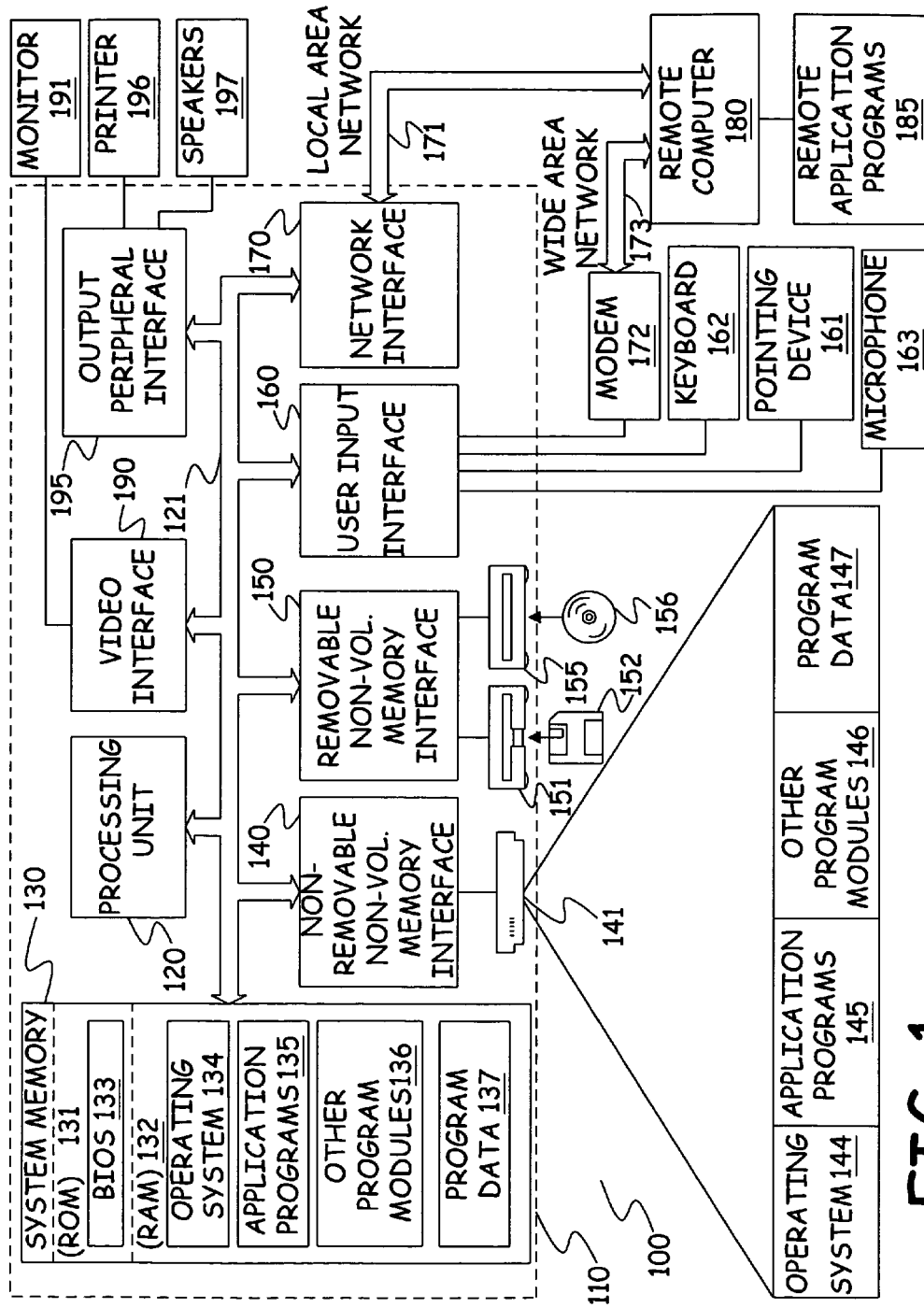
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
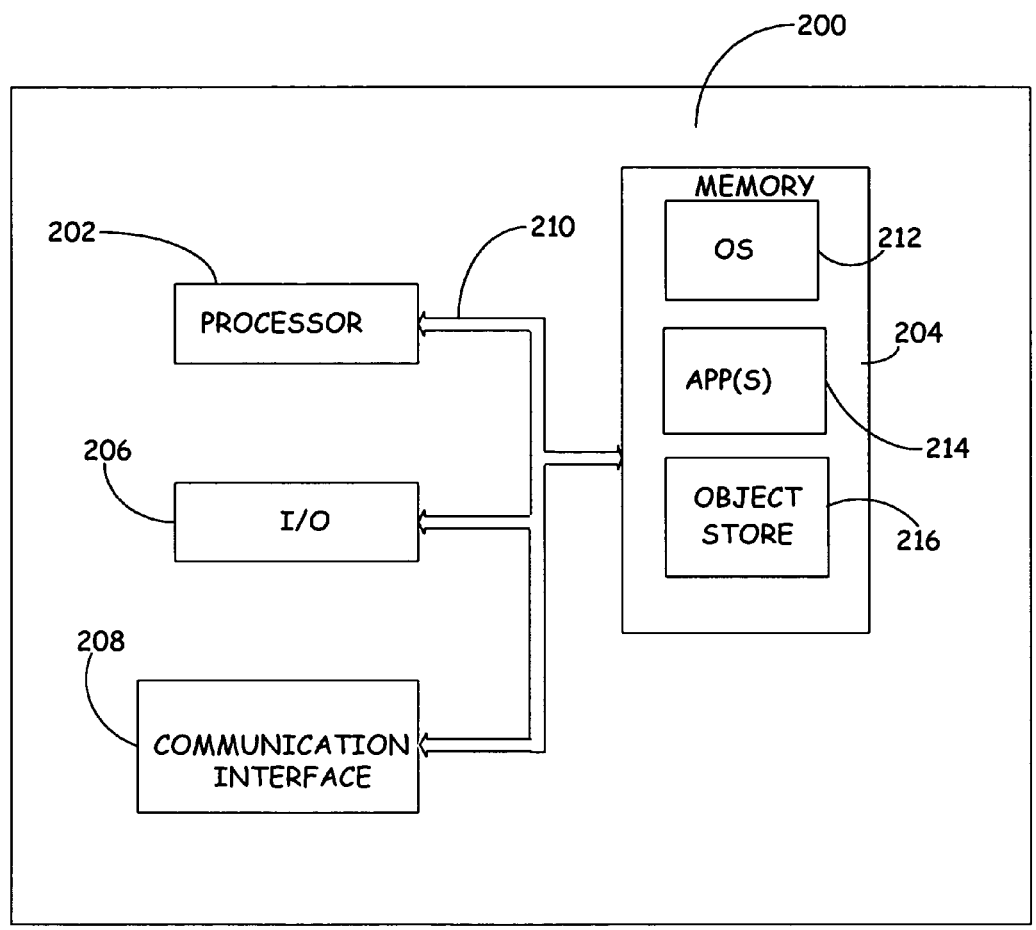
FIG. 2 is a block diagram of a general mobile computing environment in which the present invention can be implemented.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

In accordance with embodiments of the present invention, a capability manager component is provided which implements improved dynamic service discovery functions, enabling complying applications to utilize each others functionality in a loosely coupled way by describing the context needed for interaction.

A context is set of information about the user and what he/she is working on and the surrounding environment. Context must contain type information (metadata) so that a capability manager (discussed below) can find relevant services. Context can contain other information such as: Actual Data, user Identification and any other type of information relevant for execution or discovery of services. If Context contains a "Customer type", when the client asks for a list of available services from the capability manager the result will be a list of services, using the inventive concepts described below, that can handle Customer data. For example, a service can register in the system as being able to handle the context of "Customer type" where "country=Iceland". The capability manager described below will only return a "Service information object" (described later) to this service if the context is "Customer type" and contains a data field named "country" and its value equals "Iceland".

As is described in detail below, the concepts of the present invention allow existing independently created applications to share functionality or services without the need for hard coding the specific integration functionality into the applications. Further, a number of advantageous dynamic discovery functions can be provided in accordance with the present invention to enhance the process of registering, searching and using services from other applications.

Figures 1, 3:
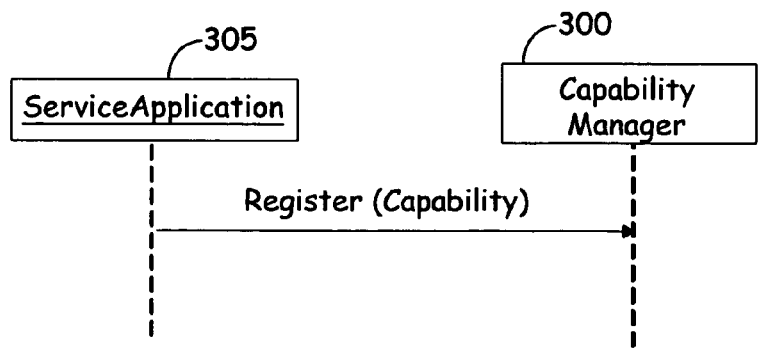
Figures 2, 3:
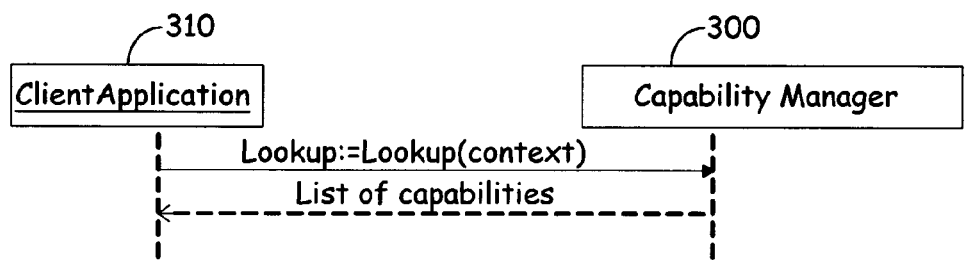

Referring now to FIGS. 3-1 and 3-2, shown are a capability manager 300, along with a service registering application 305 and a client or service using application 310. In FIGS. 3-1, service providing application 305 is illustrated registering or publishing one or more capabilities, services or functions with the dynamic service discovery system provided or facilitated by capability manager 300. Service providing application 305 represents one of many such applications which publish their capabilities by describing the context of where the feature can be used.

An example of a service publishing application could be Microsoft Word. When installed on a computer, the Microsoft Word application could publish it's capability of "Write letter to customer". By publishing or registering this service, this example of a service registering application would notify the service discovery system provided at least in part by capability manager 300 that it has a service, named "Write letter to customer," that works with data of the type "customer." This service registering application would also notify the capability manager of how the dispatcher 630 (shown in FIG. 6) system can activate and bind to it (for example by Web service URL, etc.).

In FIGS. 3-2, client application 310 is shown using capability manager 300 to discover or search for available services. As used herein, in some embodiments a client application is an independent application, created without knowledge of the services which have been registered by other service providing applications. In discovering available capabilities, client application 310 describes it's data context (for example using the Lookup(context) command) and asks for capabilities available which work with that context of data. Capability manager 300 returns a list of capabilities or services which can be provided by other applications for this particular context of data and how the dispatcher 630 can bind to them.

Each request to the capability manager will result in retrieval or return of zero or more "Service information objects". A service information object contains information about the service from which it is returned. Service information objects contain at least the binding information to the service, in other words, how the service can be activated/executed/called. This information is protocol specific. It may contain a label for displaying in a user interface (UI), and that label can be localized to the user language if that information is available in the context. Service information objects can also contain information on class of service, and where in the UI it could be placed. The UI placement is up to the caller.

Binding to a service is protocol specific so a protocol handler needs to be installed in the dispatcher to activate/bind/call a service. The caller will give the context information and the service binding information received from the service information object to the dispatcher. The dispatcher will then bind to and activate/call the service.

As an example of a client application discovering a capability or service, an Enterprise-Resource-Planning (ERP) system application can describe it's needed data context and discover that "Write letter to customer" capability is now available on the system. With the aid of capability manager 300, it can then show that feature to a user in form of button, menu item, or any other form that fits that client application. When the user decides to execute the capability, the context information is transferred to the service via the dispatcher 630. These and other features of the capability manager are described below in greater detail.

Figure 4:
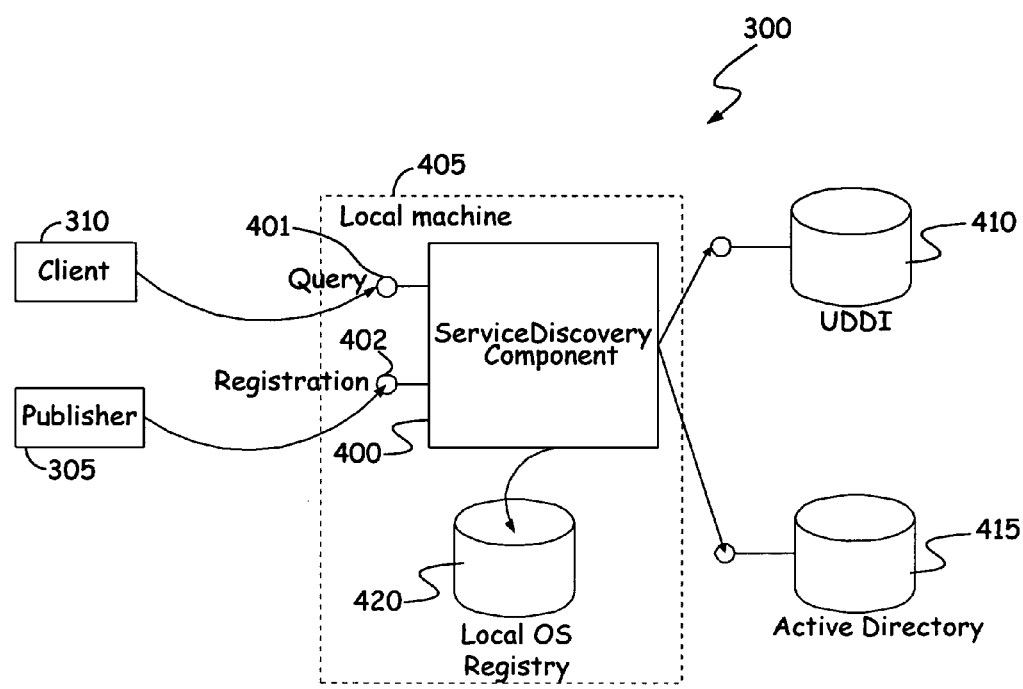
FIG. 4 is a block diagram illustrating some service discovery aspects of the capability manager illustrated in FIGS. 3-1 and 3-2 in accordance with some embodiments of the present invention.

Referring now to FIG. 4, shown is a service discovery component 400 of capability manager 300. Service discovery component 400 is illustrated operating on a local computer or machine 405. Although other components of capability manager 300 are not shown in FIG. 4, these other components can also operate on the same local computer 405, as can client application 310. Further, publisher or service providing application 305 can reside on the same computer or system in some embodiments, though this need not be the case.

Service discovery component 400 provides interfaces for registering (publishing) and discovering (searching for) services. In addition, service discovery component 400 adds some very useful extra functionality that would be costly and time-consuming to implement in a series of applications. Service Discovery component 400 can be used to establish registration/discovery between applications that agree upon some private and proprietary format of information. Service Discovery component 400 generalizes the steps involved in discovering and registering services, functions or capabilities for applications, and provides a uniform interface for the discovery and registration processes.

Again shown in FIG. 4 are client application 310 that seeks to discover services which it can utilize, and service or publisher application 305 that has or will register its services with capability manager 300 using service discovery component 400. Service discovery component 400 includes two public interfaces 401 and 402 for queries and for registration. The query interface 401 is used by clients for discovering services. The registration interface 402 is used by applications ("Publishers") for registering ("publishing") services.

A repository 410 of services (labelled UDDI) can be any available services repository, but in some exemplary embodiments is a UDDI based repository of services. Active directory 415 can be included to allow, for example in large organizations, service discovery component 400 to query several UDDI repositories for available services. Local operating system registry 420, which can be for example a local Windows® registry, is a local repository for publishing services that is used by some applications, for example Microsoft Office®. In accordance with some exemplary embodiments of the present invention, service discovery component 400 merges this (local) information with information fetched from UDDI 410 (or other UDDI repositories using active directory 415) or other similar service repositories. This does not mean that the local OS registry 420 is used to create a local replica of the general (UDDI-based) repository, but rather that the service discovery component can merge the services registered in these two registries or repositories. This allows a client application 310 to use service discovery component 400 to discover both services registered with an internet or other computer system based registry, and local services offered by other applications running on the local computer 405 on which service discovery component 400 (and optionally other components of capability manager 300) is running. As mentioned above, this can also be the same computer on which the client application 310 is running.

Figure 5:
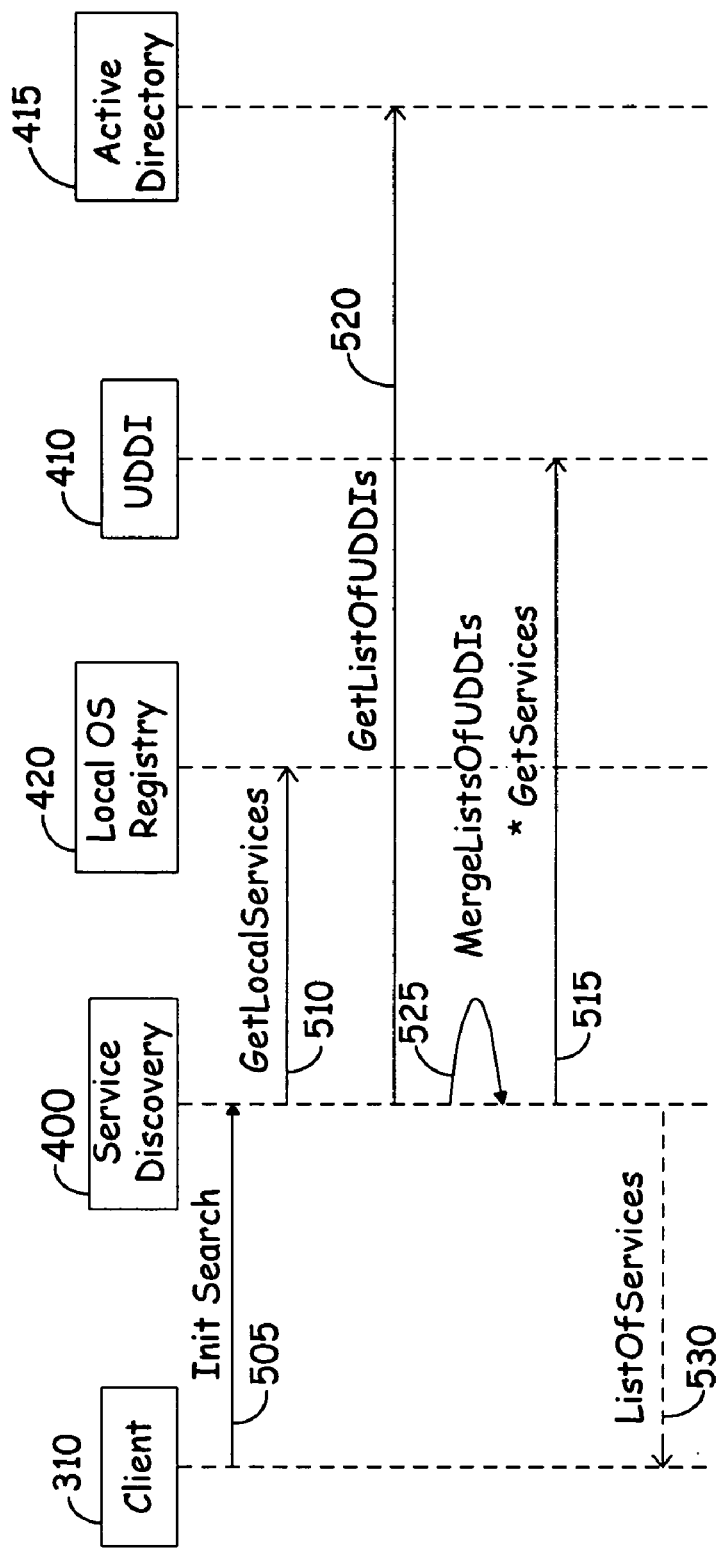
FIG. 5 is a diagrammatic illustration of a sequence of a search initiated by using the Query interface shown in FIG. 4.

The diagram illustrated in FIG. 5 shows a sequence of a search initiated by using the query interface 401. As shown at 505 in FIG. 5, the client application 310 initiates a search for services. The service discovery component 400 takes several actions in response to this initiated search. For example, as shown at 510 in FIG. 5, the service discovery component 400 retrieves a list of local services from local OS registry 420. These local services, which can be provided by other applications on the local computer 405 on which service discovery component 400 and/or client application 310 are running, are included on the list only if they meet the context requirements of client application 310.

Also in response to the initiated search, service discovery component 400 can in some embodiments retrieve a list of UDDI type registries from active directory 415 as is illustrated in FIG. 5 at 520. As is illustrated at 515 in FIG. 5, the service discovery component 400 retrieves one or more lists of services from one or more UDDI type registries 410. Again, services are included on the list only if they meet the context requirements of client application 310. Then, as shown at 525, service discovery component 400 merges the local and non-local (e.g. UDDI type) lists of services and provides the merged lists of services to client application as shown at 530.

Service discovery component 400 and other components of capability manager 300 provide numerous benefits in various embodiments of the invention. One such benefit is that they enable easy decoupling of modules. By factoring service discovery out into a separate component with well-defined interfaces, it is made easy for client applications to implement service discovery and thus use web and other services. Furthermore, the service discovery component offers functionality over and above what is typically accomplished by discovering through direct requests to repositories such as UDDI. This includes the ability to register and discover services based on type (e.g. "Party" or "Order"), based on a type with a filter (e.g. "Customers in Denmark"), or based on an instance (e.g. the customer called "John Doe Inc.", or the invoice with the number "4711").

Another benefit provided is that service discovery component 400 and capability manager 300 enable runtime binding of modules. Services can be registered at runtime, and discovered at runtime, making a highly dynamic binding of modules possible. For example, an application can register a service on a processed order when that order is processed, and another application will discover this service the next time it asks for services for processed orders.

Another benefit is that there is little, if any, need for hard-coded service discovery logic in the application. Factoring the service discovery out in a separate component not only makes it much simpler for applications to use service discovery, it actually also makes it possible to change the implementation of the service discovery while keeping the interfaces stable. Further, using service discovery component 400 and capability manager 300, a function can be added to multiple clients applications. When an application registers a service, for example a service for an instance of an order that lets that order be confirmed, any application that has the necessary credentials can discover the service and execute it.

As is described further below with reference to FIG. 6, the present invention supports process-aware enabling and disabling of services. Depending upon the level of integration effort put into an application, the service discovery component or other components of capability manager 300 allow decisions to be made about enabling and disabling of services based on the state of a business process. For example, services that act on process orders can be enabled only at the point in the process where this is relevant.

Another benefit which can be realized using the capability manager and service discovery component of the present invention is due to the grouping of discovered services based on metadata in some embodiments. The consumer or client application may or may not use this information to enhance navigation in the result set of available services (e.g. by using this information to add services as menu items to the appropriate menus within the client application). Further, the names of services are localizable (can be presented in a language chosen by the consuming or client application), and can also be context-sensitive, so that the same service can have different names when used in different functional areas of a client application.

Figure 6:
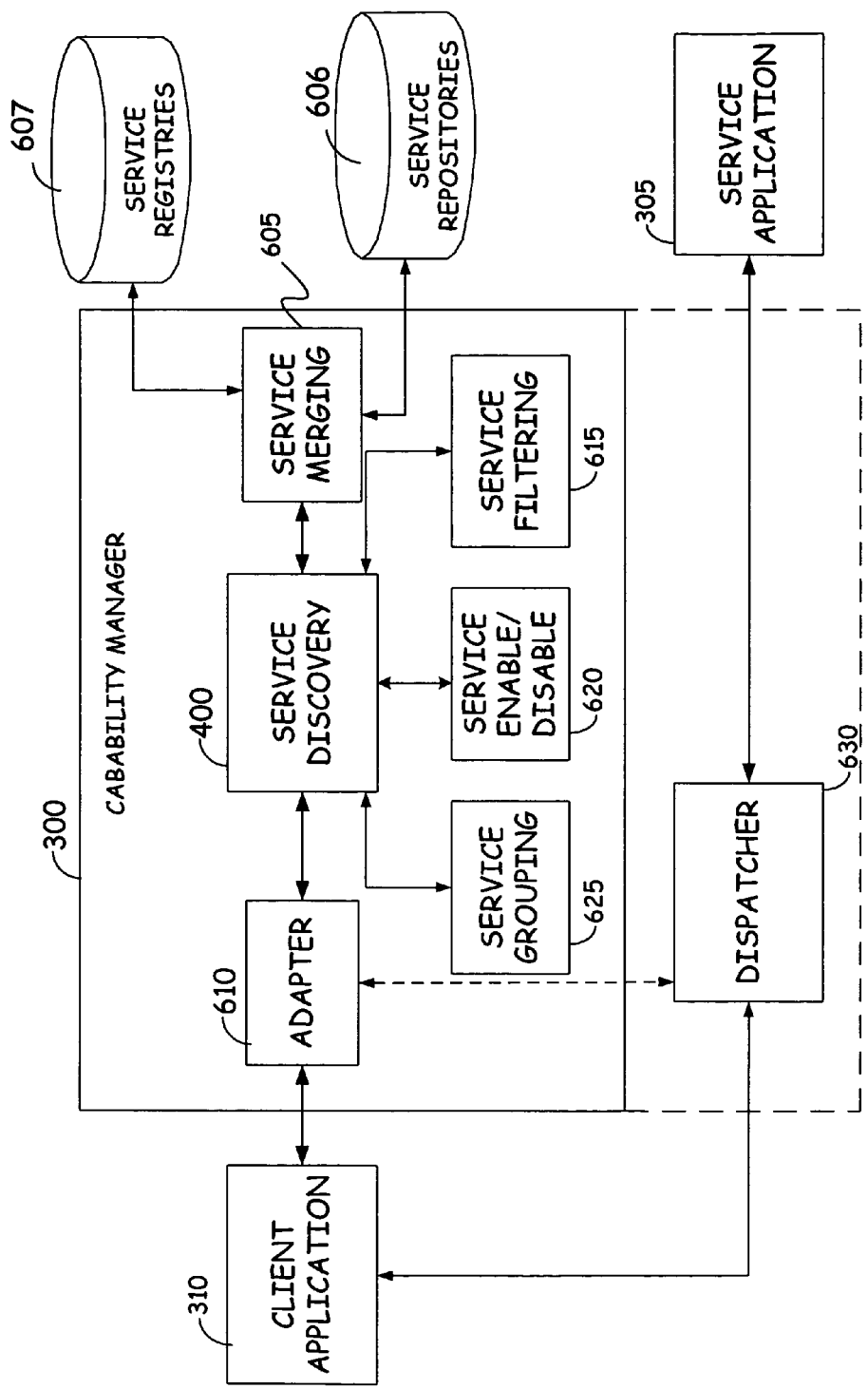
FIG. 6 is a block diagram illustrating other service discovery aspects of the capability manager in accordance with some embodiments of the present invention.

Referring now to FIG. 6, shown is a block diagram illustrating various service discovery related functions implemented by capability manager 300 in accordance with various embodiments of the present invention. While these various functions are discussed as components which interact with service discovery component 400, in other embodiments these functions can be implemented within service discovery component 400. Further, while these various functions are illustrated together in an embodiment of capability manager 300, the present invention is not limited to a capability manager or service discovery component configured to implement all of these functions. Instead, FIG. 6 is intended to represent various functions/components that can be implemented together or independently of each other.

As shown in FIG. 6, embodiments of the capability manager 300 can include a service merging component 605 to merge services from service repositories 606 (such as one or more UDDI type or other repositories 410) and from local service registries 607 (such as local OS registry 420). This function was described above with reference to FIG. 5. Again, it is not necessary that the service merging function be implemented in a separate component from service discovery component 400, and illustration of component 605 (and other components in FIG. 6) are also intended to represent capability manager functions that can be implemented as desired within or in conjunction with the general service discovery functions/component 400.

Also illustrated in FIG. 6 is a service filtering component or function 615. Service filtering component or function 615 filters the list of services such that it includes only those which meet one or more filtering criteria based on the required data context of the client application. As noted above, and provided by way of example, this can include filtering out services such that services are discovered and provided to the client application only if they operate on a particular property or entity type (e.g. "Party" or "Order"). This can further include filtering out services such that only those which meet a more specific criteria, such as having a particular property value, are discovered and provided to the client application. As an example of this more particular filtering, service filtering component 615 can filter the list of services such that not only are all listed services related to the "Customer" type, but all listed services are more specifically related to "Customers in Denmark". As another example, service filtering component 615 can filter services based on an instance (e.g. the customer called "John Doe Inc.", or the invoice with the number "4711").

Service enable/disable component 620 of capability manager 300 functions to determine which functions or services are to be enabled or disabled based on a state of a business process. As described above, and provided by way of example, service enable/disable component 620 could be used to enable services only at the point in a business process where the service is relevant. This component thus supports process-aware enabling and disabling of services.

Service grouping component 625 can be included to implement the grouping functions described above. In other words, component or function 625 can group discovered services based on metadata or other parameters. The consumer or client application can then use this information to enhance navigation in the result set of available services (e.g. by using this information to add services as menu items to the appropriate menus within the client application).

In some embodiments of the invention, it is desirable to enable existing independent applications to use discovered services with no (or few) adaptations or modifications to the applications. Adapter 610 can be included in capability manager 300 to achieve this integration. In some embodiments, adapter 610 transforms data as found in client applications into business entities, for example using maps and map engines. The resulting, automatically generated, business entities are then used to query the service discovery component for services and to use these services. Resulting data from the service is also, transparently, mapped back into the data representation of the client application by adapter component 610. Doing these mappings or adaptations of data within capability manager 300, it became possible to add Web or other services to existing client applications, and to create context-aware menu items in the client applications.

Once a client application 310 has discovered a service provided by a service application 305 using capability manager 300, when the client application decides to execute or dispatch the capability or service, the context information or data required to execute the service (a service activation command) is transferred to the service or service application using a dispatcher component or function 630. This dispatcher component or function 630 can reside within capability manager 300, or it can be a separate component altogether. Further, in some embodiments, the context information provided to the service application by dispatcher 630 can be in an adapted or mapped form as generated by adapter 610. Thus, a connection between adapter 610 and dispatcher 630 is shown in dashed line to represent this optional configuration.

Although the present invention has been described with reference to particular embodiments, workers skilled in the art will recognize that changes may be made in form and detail without departing from the spirit and scope of the invention.

What is claimed is:

1. A computer-implemented method of providing dynamic service discovery to a client application, the method comprising:

receiving a context specific request, from the client application, to discover services available from independent service providing applications, wherein service providing applications are independent service providing applications only if they are created without knowledge of functionality of the client application and if no hard coding between the client application and the service providing applications exists;

retrieving at least one list of services provided by independent service providing applications, along with service binding information for the services on the at least one list, which correspond to the context specific request;

storing the at least one list of services along with the service binding information; and providing the at least one list of services to the client application, with the service binding information, for use by the client application utilizing discovered services.

2. The method of claim 1, wherein retrieving the at least one list of services provided by independent service providing applications further comprises:

retrieving a first list of services provided by independent service providing applications, along with service binding information for the services on the first list, which correspond to the context specific request; and retrieving a second list of services provided by independent service providing applications, along with service binding information for the services on the second list, which correspond to the context specific request.

3. The method of claim 2, and further comprising merging the first and second lists of services into a merged list of services, provided by independent service providing applications, which correspond to the context specific request.

4. The method of claim 3, wherein retrieving the first list of services further comprises retrieving the first list of services from a local operating system registry.

5. The method of claim 4, wherein retrieving the second list of services further comprises retrieving the second list of services from a computer network service repository.

6. The method of claim 3, wherein retrieving the first list of services further comprises retrieving the first list of services using a service discovery component.

7. The method of claim 6, wherein retrieving the second list of services further comprises retrieving the second list of services using the service discovery component.

8. The method of claim 3, and further comprising filtering at least one of the first list of services, the second list of services, and the merged list of services such that it includes only services which meet one or more filtering criteria based on a data context of the client application.

9. The method of claim 8, wherein filtering the at least one of the first list of services, the second list of services, and the merged list of services such that it includes only services which meet one or more filtering criteria based on the data context of the client application further comprises filtering based on entity type.

10. The method of claim 8, wherein filtering the at least one of the first list of services, the second list of services, and the merged list of services such that it includes only services which meet one or more filtering criteria based on the data context of the client application further comprises filtering based on a property value.

11. The method of claim 8, wherein filtering the at least one of the first list of services, the second list of services, and the merged list of services such that it includes only services which meet one or more filtering criteria based on the data context of the client application further comprises filtering based on an instance of an entity.

12. The method of claim 1, and further comprising enabling or disabling at least one service as a function of a state of a process associated with the client application.

13. The method of claim 1, wherein receiving the context specific request, from the client application, further comprises:

transforming data from the client application into a business entity; and retrieving the at least one list of services using the business entity.

14. The method of claim 1, and further comprising runtime registering of services by enabling or disabling services as a function of a state of an entity or process associated with the client application.

15. The method of claim 1, and further comprising dispatching service activation commands by receiving a context specific activation request with the service binding information, from the client application, and delivering that request to an activated service endpoint associated with one or more of the independent service providing applications.

16. A capability manager apparatus, embodied in a computing device, for providing dynamic service discovery to a client application, the apparatus comprising:

a query interface which receives a context specific request, from the client application, to discover services available from independent service providing applications, wherein service providing applications are independent service providing applications only if they are created without knowledge of functionality of the client application and if no hard coding between the client application and the service providing applications exists; and a service discovery component which is configured to receive the context specific request from the query interface and in response to retrieve at least one list of services provided by independent service providing applications, along with service binding information for the services on the at least one list, which correspond to the context specific request, the service discovery component providing the at least one list of services to the client application with the service binding information for use by the client application utilizing discovered services.

17. The apparatus of claim 16, wherein the service discovery component is configured to retrieve first and second lists of services provided by independent service providing applications, along with service binding information for the services on the first list, which correspond to the context specific request.

18. The apparatus of claim 17, and further comprising a service merging component configured to merge the first and second lists of services into a merged list of services, provided by independent service providing applications, which correspond to the context specific request.

19. The apparatus of claim 18, wherein the service discovery component is configured to retrieve the first list of services from a local operating system registry.

20. The apparatus of claim 19, wherein the service discovery component is configured to retrieve the second list of services from a computer network service repository.

21. The apparatus of claim 18, and further comprising a service filtering component configured to filter at least one of the first list of services, the second list of services, and the merged list of services such that it includes only services which meet one or more filtering criteria based on a data context of the client application.

22. The apparatus of claim 21, wherein the service filtering component is configured to filter the at least one of the first list of services, the second list of services, and the merged list of services based on entity type.

23. The apparatus of claim 21, wherein the service filtering component is configured to filter the at least one of the first list of services, the second list of services, and the merged list of services based on a property value.

24. The apparatus of claim 21, wherein the service filtering component is configured to filter the at least one of the first list of services, the second list of services, and the merged list of services based on an instance of an entity.

25. The apparatus of claim 16, and further comprising a service enable/disable component configured to enable or disable at least one service as a function of a state of a process associated with the client application.

26. The apparatus of claim 16, and further comprising an adapter configured to transform data from the client application into a business entity, wherein the service discovery component is configured to retrieve the at least one list of services using the business entity.

27. The apparatus of claim 16, and further comprising a dispatcher component which executes service activation commands by receiving a context specific activation request with the service binding information, from the client application, and delivering that request to an activated service endpoint associated with one or more of the independent service providing applications.

28. The apparatus of claim 16, and further comprising a registration interface through which services from independent service providing applications are registered with the service discovery component.

* * * * *